March 20, 1956 P. MOSER 2,738,726
BALING CASE
Filed Sept. 1, 1951 3 Sheets-Sheet 1

Inventor:
PAUL MOSER

HIS AGENTS

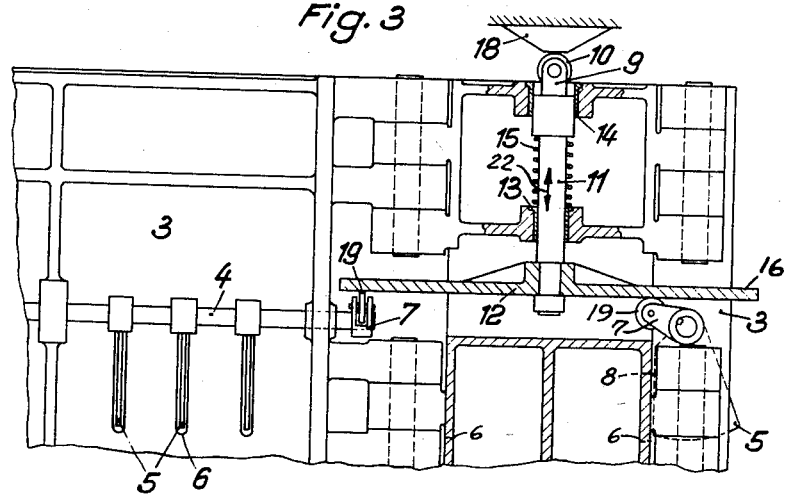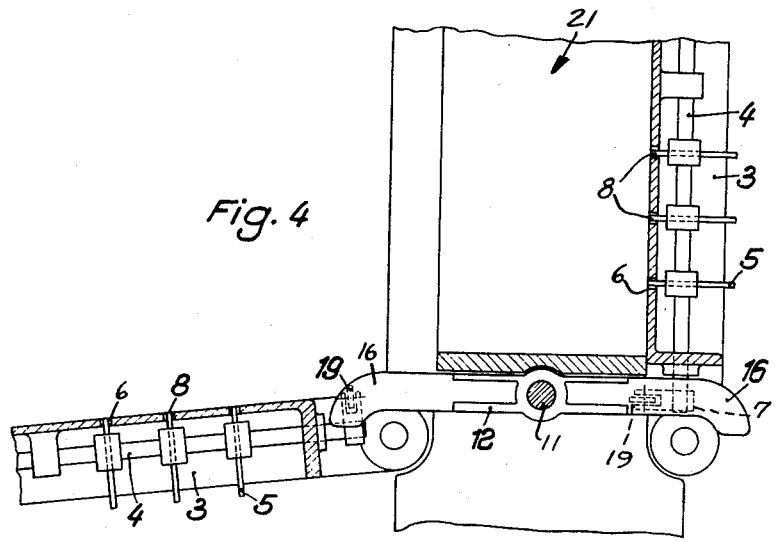

March 20, 1956 P. MOSER 2,738,726
BALING CASE
Filed Sept. 1, 1951 3 Sheets-Sheet 3

INVENTOR:
PAUL MOSER,
BY Freeman & Marmorek,
His Agents.

United States Patent Office 2,738,726
Patented Mar. 20, 1956

2,738,726

BALING CASE

Paul Moser, Buderich, near Dusseldorf, Germany, assignor to Waldemar Lindemann, Dusseldorf, Germany Application September 1, 1951, Serial No. 244,751

Claims priority, application Germany September 6, 1950

3 Claims. (Cl. 100—220)

The invention relates to baling and relates more particularly to baling pressing, for the forming into bales of articles like wool, rayon, or the like. Still more particularly the invention relates to casings for use in connection with baling presses.

The baling compressing usually is carried out by a baling press, the goods being held in a baling casing. Since the compressing may be made in successive steps in a series of press machines, it is necessary to employ a mechanism in connection with the baling casing to restrain expansion of the compacted bales between the press steps. Baling casings usually are provided with doors for opening and closing the casings, and the mechanism for retaining the bale shape may be built into the doors.

Mechanisms for retaining the bale in shape, have in the past eluded successful solution of the requirement that the mechanism must be operable while the doors of the baling case are closed as well as while they are open.

The invention has therefore among its objects the provision of a baling case with a mechanism that permits bale shape retention in any position of the doors between open and closed stations thereof.

With the above and other objects of the invention in view, the invention consists in the novel construction, arrangement and combination of various devices, elements and parts, as set forth hereof, one embodiment of the same being illustrated in the accompanying drawings and described in the specification.

For a fuller understanding of the nature and objects of the invention, reference should be had to the following detailed description, taken in connection with the accompanying drawings, in which:

Fig. 3 is a fragmentary sectional view similar to Fig. 1, but showing one of the doors open;

Fig. 4 is a fragmentary sectional view similar to Fig. 2, but showing one door open as illustrated in Fig. 3;

Figure 1:
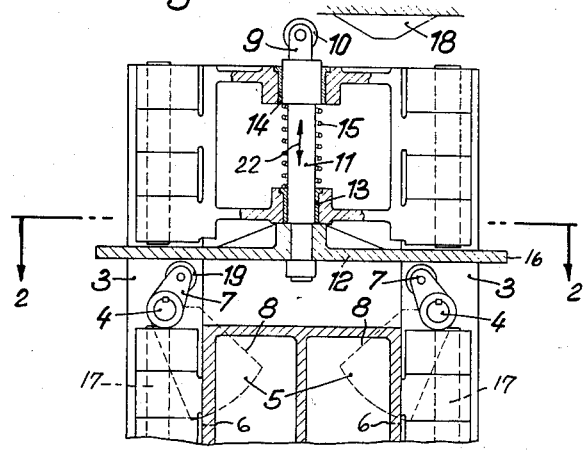
Fig. 1 is a fragmentary sectional view, taken on line 1—1 of Fig. 2, of a baling case in accordance with the invention with the case doors shown closed.
Figure 2:
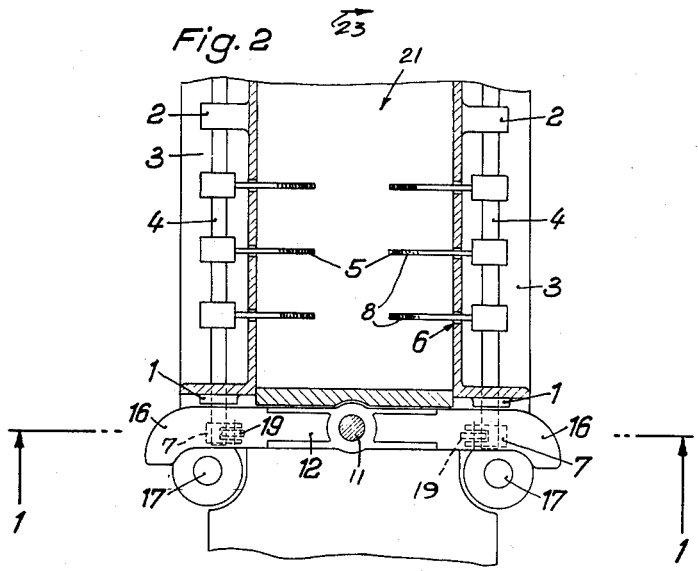
Fig. 2 is a fragmentary sectional view taken on line 2—2 of Fig. 1.

In carrying the invention into effect in one of the embodiments which has been selected for illustration in the accompanying drawings and for description in this specification, and referring now particularly to Figs. 1 and 2, there is provided a baling case indicated at 21 that has side walls including two opposite doors 3. Each of the doors 3 is swingable between a closed position (Figs. 1 and 2) and an open position (left side of Figs. 3 and 4) about a hinge 17. The hinges 17 are oppositely spaced from each other.

Figure 5:
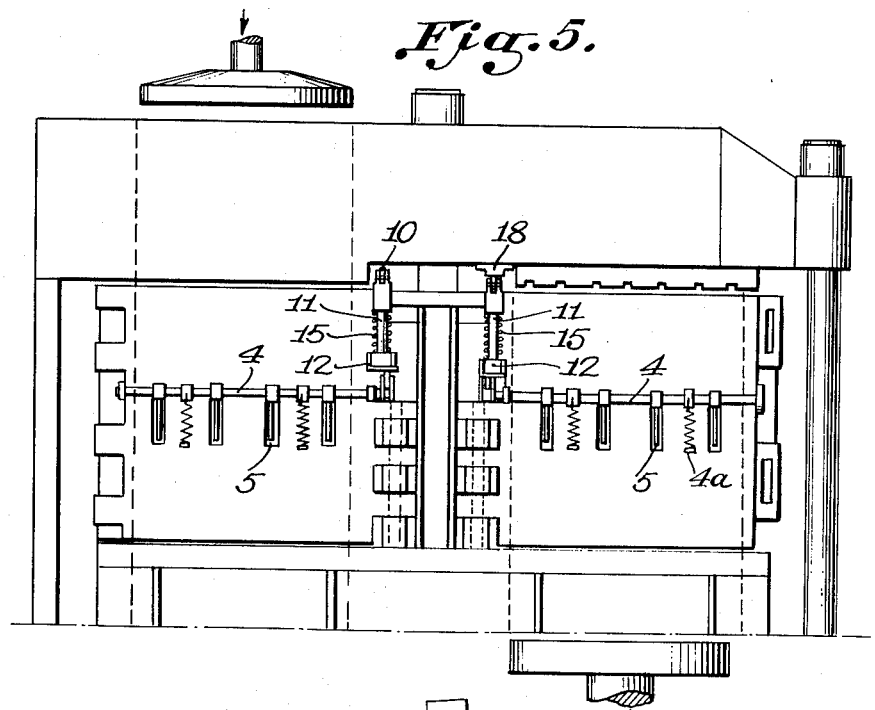
Fig. 5 is a side elevational view of a baling case in a baling press.
Figure 6:
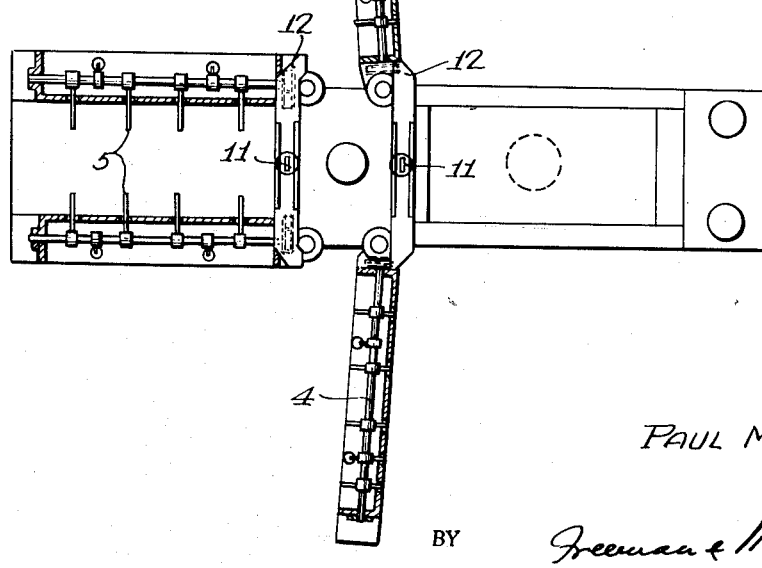
Fig. 6 is a plan view of the baling case of Fig. 5 with the doors open.

Each door 3 carries a shaft 4 that is journalled in bearings 1 and 2, and that carries securely connected thereto a series of shape retaining fingers 5. The fingers 5 of each door 3 are movable with the shaft 4 about the shaft axis, between a projected bale shape retaining position (Figs. 1 and 2), and a retracted position wherein the fingers are completely within the confines of the door 3 (Figs. 3 and 4 and 6). The fingers 5 are disposed in slots 6 of the door wall, and are provided with inner edges 8 that will be substantially flush with the door wall exterior in the retracted position. The fingers 5 are biased, for instance by spring means 4a, to rest normally in the projected position (Figs. 1, 2 and 5).

A mechanism is provided to actuate the fingers 5 to move them into the retracted position irrespective of the position of the door 3 thereof. The mechanism includes means for turning the shaft 4 of each door 3, and comprises a cam 12 reciprocable in opposite directions as indicated by an arrow 22 (Figs. 1 and 3) and a cam follower means connected to each shaft 4, such as a lever 7, that extends from the shaft at an angle to the axis thereof and that carries on its free end a roller 19.

Each of the rollers 19 will describe, during the opening and closing of its door 3, an arcuate path about its hinge 4. Accordingly, the cam 12 is provided with opposite extensions 16, one for each roller 19, so that each side of the cam 12 will always be opposite the path of a roller 19. Thereby, interengagement between the cam 12 and the rollers 19 can be made and sustained throughout the roller path, in any position of the doors 3.

The cam 12 is urged into a position of disengagement with the rollers 19 (see Fig. 1) by means of a coil pressure spring 15 that presses into one direction (upwardly, Fig. 1) a carrier 11 to which is secured the cam 12. Said carrier 11 is slidable in bearings 13 and 14, and carries on the exterior of the case 21 an extension 9 to which there is journalled a rotary member 10.

The case 21 is arranged, for instance at or near the completion of its movement for emplacement in the baling press, to pass in direction 23 near a fixed cam 18 that is provided in the path of the rotary member 10. Upon engagement of the rotary member 10 by the cam 18, the carrier 11 will be pressed inwardly into the case (downwardly, Fig. 1), to bring about interengagement between the cam 12 and the rollers 19, for retraction of the fingers 5.

The operation of the above described invention is as follows.

The fingers 5, when the doors 3 are closed will normally, due to their biasing, project into the interior of the case 21 to retain therein the shape of the bale that is placed in the case 21, for instance during interpress intervals. When the cam 12 is out of engagement with the rollers 19, the carrier 11 that carries the cam 12 is held in its outward position (upwardly, Fig. 1), and the rotary member 10 projects from the case 21.

Upon emplacement of the case 21 into the press, the nose 18 will engage the rotary member 10, forcing the carrier 11 and thereby the cam plate 12 inwardly of the case 21. Thereupon, the cam 12 will engage the rollers 19 and will rotate the levers 7, and thereby turn the shafts 4; turning of the shaft 4 will retract the fingers 5 into the walls of the doors 3 (Fig. 4 and Figure 6).

If thereafter the doors 3 are swung about the hinges 17, the fingers 5 will remain in retracted position, owing to the continued engagement of the cam 12 and the rollers 19, at the extensions 16 of the cam 12. The fingers 5 will remain retracted also during subsequent closing of the doors 3. This enables operations on the bale, such as wrapping and tying, etc. without any obstruction by the retaining fingers 5.

Upon removal of the case 21 from the bale press, the rotary member 10 will be released by the cam 18, and the spring 15 will return the carrier 11 and the cam 12 to its rest position out-of-engagement with the rollers 19, and the fingers 5 under the urge of their biasing force will return to the projected position.

Certain of the advantages of the invention have already been herein referred to. It may be useful, however, to allude particularly at this point to the advantage of moving of the fingers 5 against the biasing force while the cam 12 is in its rest position.

It will be apparent to those skilled in the art that the novel principles of the invention disclosed herein in connection with the specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent, is as follows:

1. In a press a baling case having a support, a side wall having at least one door swingable about a vertical hinge between closed and open positions, a bale shape retaining mechanism comprising a shaft turnably journalled in said door and swingable therewith and extending to the exterior of said door near said vertical hinge, a lever connected to the extending portion of said shaft and operable to turn said shaft, said door having a plurality of slots which communicate with the interior of the case when the doors are in "closed" position, fingers disposed in said slots and secured to said shaft and movable thereby between opposite positions of projection from said door and retraction within the confines thereof, respectively, said fingers normally being biased into said projected position, means mounted on the press support operable to engage and tilt said lever for turning said shaft and thereby moving said fingers into said retracted position in all positions of said door, and a stationary cam provided on the baling press support for actuating the said means mounted on the press and operable to engage and to tilt said lever for turning said shaft, when the baling case is brought to its bale pressing position.

2. In a baling case, as claimed in claim 1, said lever extending from said shaft at an angle to the shaft axis, a roller on said lever, a reciprocating element operable to engage said roller for turning said lever and said shaft, cam and follower means operable for moving said element in one direction to engage said roller for turning said shaft to retract said fingers, and resilient means actuable for moving said element in an opposite direction to release said roller whereby said fingers will be returned into projected position.

3. In a baling case, as claimed in claim 1, said shaft turning means comprising a cam follower extending from said shaft at an angle to the shaft axis and describing an arcuate path during door swing movement, a reciprocable cam opposite the path of said cam follower and being actuable to engage said cam follower to move the same for turning said shaft, and means for actuating said cam.

References Cited in the file of this patent

UNITED STATES PATENTS

| | | |
|---|---|---|
| 302,355 | Price | July 22, 1884 |
| 1,189,095 | Grimes | June 27, 1916 |
| 1,553,434 | Cameron | Sept. 15, 1925 |
| 1,848,285 | Wallace | Mar. 8, 1932 |
| 2,169,667 | Streun | Aug. 15, 1939 |
| 2,209,740 | Steinhauser | July 30, 1940 |
| 2,241,006 | Smith et al. | May 6, 1941 |
| 2,392,465 | Deems | Jan. 8, 1946 |